(12) United States Patent
Nevil et al.

(10) Patent No.: US 8,472,449 B2
(45) Date of Patent: Jun. 25, 2013

(54) PACKET FILE SYSTEM

(75) Inventors: Daris A. Nevil, Fairview, TX (US); Uma Gavani, Richardson, TX (US)

(73) Assignee: Intrusion, Inc., Richardson, TX (US)

( * ) Notice: Subject to any disclaimer, the term of this patent is extended or adjusted under 35 U.S.C. 154(b) by 278 days.

(21) Appl. No.: 12/715,533

(22) Filed: Mar. 2, 2010

(65) Prior Publication Data

US 2011/0216774 A1 Sep. 8, 2011

(51) Int. Cl.
*H04L 12/28* (2006.01)

(52) U.S. Cl.
USPC ........................................ 370/395.1; 709/244

(58) Field of Classification Search
USPC ................ 370/242, 252, 325, 395.1, 395.3, 370/395.72, 411, 428; 709/224, 230, 232, 709/234, 244
See application file for complete search history.

(56) References Cited

U.S. PATENT DOCUMENTS

| | | | |
|---|---|---|---|
| 5,519,504 A | 5/1996 | Kessen | |
| 6,025,971 A * | 2/2000 | Inoue et al. | 360/77.08 |
| 7,173,943 B1 | 2/2007 | Borchew et al. | |
| 7,356,243 B2 | 4/2008 | Kim et al. | |
| 7,362,958 B2 | 4/2008 | Sako et al. | |
| 7,406,095 B2 | 7/2008 | Morinaga et al. | |
| 7,587,513 B1 | 9/2009 | Maturi et al. | |
| 7,634,174 B2 | 12/2009 | Adolph et al. | |
| 2002/0021756 A1 * | 2/2002 | Jayant et al. | 375/240.16 |
| 2005/0060403 A1 * | 3/2005 | Bernstein et al. | 709/224 |
| 2005/0234915 A1 * | 10/2005 | Ricciulli | 707/10 |
| 2006/0209699 A1 * | 9/2006 | Tamura et al. | 370/242 |
| 2007/0011321 A1 * | 1/2007 | Huntington et al. | 709/224 |
| 2009/0028144 A1 | 1/2009 | Blair | |
| 2009/0079835 A1 * | 3/2009 | Kaplan et al. | 348/207.1 |
| 2009/0175355 A1 * | 7/2009 | Gordon et al. | 375/240.25 |
| 2009/0182953 A1 | 7/2009 | Merkey et al. | |
| 2009/0207750 A1 * | 8/2009 | Robinson | 370/252 |
| 2009/0213924 A1 | 8/2009 | Sun et al. | |
| 2009/0263104 A1 | 10/2009 | Tsutsumi | |
| 2009/0281984 A1 | 11/2009 | Black | |

OTHER PUBLICATIONS

"File system", Wikipedia, http://en.wikipedia.org/wiki/Filesystem, printed Feb. 25, 2010.
McKusick, Karels, Bostic, "A Pageable Memory Based Filesystem", Computer Systems Research Group, University of Berkeley, Berkeley, CA, http://docs.freebsd.org/44doc/papers/memfs.pdf, (no date).
Declan McCullagh, "FBI wants records kept of Web sites visited", cnet news, http://news.cnet.com/8301-13578_3-10448060-38.html?tag=rtcol;pop, dated Feb. 5, 2010.

* cited by examiner

*Primary Examiner* — Hassan Phillips
*Assistant Examiner* — Ajay Cattungal
(74) *Attorney, Agent, or Firm* — Alvin R. Wirthlin

(57) ABSTRACT

A system and method of recording packets and packet streams to random-access block-oriented recording media, and retrieving the packets and packet streams from said recording media is disclosed. Incoming packets are copied into very large fixed sized blocks, which in turn are distributed to a plurality of disk drives for recording. Supplementary blocks of index data constructed as packets are received and recorded. The index data reduces the time required to locate and read specific packets and packet streams from the recording media. Recorded packets are retrieved and converted to standard pcap format files.

40 Claims, 14 Drawing Sheets

US 8,472,449 B2

PACKET FILE SYSTEM

CROSS-REFERENCE TO RELATED APPLICATIONS

This application is related to U.S. application Ser. No. 12/709,383 filed on Feb. 19, 2010 and entitled "High Speed Network Data Extractor," the disclosure of which is hereby incorporated by reference.

BACKGROUND OF THE INVENTION

1. Field of the Invention

The present invention is related to computer network data analysis, and more particularly to saving network packets and network packet streams to storage, and reading network packets and network packet streams from storage.

2. Description of the Prior Art

The increasing complexity of packet-based communications networks is driving the need for more sophisticated network analysis. Perhaps a stronger driving force is the accumulation of legislation that requires network service providers, corporations, and government entities to monitor and manage their networks.

Network packet recording is a key tool used in network data analysis. Long-term trends are detected and identified by recording packet streams and replaying the streams into complex analysis algorithms. In some cases it is helpful to reconstruct the captured packet streams and reproduce the original user experience with a visual viewer and/or audio playback device.

Enforcement of legislation regarding the use of communications networks is greatly enhanced in situations where the offending communications are recorded. In some cases, such as telecommunications networks, packet recording is required by law, either on a case-by-case wire-tapping warrant, or in some cases in order to assure compliance to existing laws, such as HIPPA.

Prior art solutions have attempted to address the issue of packet recording by using existing disk operating file systems. This method is fraught with problems, including limitations of recording speed, limitations of playback speed and increased complexity. Some of these problems and their solutions in accordance with one or more aspects of the present invention will be discussed in greater detail below.

SUMMARY OF THE INVENTION

In accordance with one aspect of the invention, a system for network packet recording and retrieval includes a packet collector, a storage manager, and a storage retriever. The packet collector is operable to receive and concatenate a plurality of data packets and data packet streams into fixed sized blocks from a monitored network. The storage manager is operable to write the blocks to and read the blocks from at least one non-volatile storage device. The packet retriever is operable to locate at least one of the data packets and data packet streams in the at least one storage device and subsequently read the located packets from the at least one storage device into memory.

In accordance with a further aspect of the invention, a method for network packet recording and retrieval includes: receiving and concatenating data packets and data packet streams into fixed sized blocks from a monitored network; writing the fixed-sized blocks to and reading the blocks from at least one storage device; and locating specific data packets and packet streams in the at least one storage device and subsequently reading the located packets from the at least one storage device into memory.

In accordance with yet a further aspect of the invention, a system for network packet recording and retrieval includes at least one processor operable to execute computer program instructions, at least one memory operable to store computer program instructions executable by the processor, and computer program instructions stored in the at least one memory. The computer program instructions are executable to perform the steps of: receiving and concatenating data packets and data packet streams into fixed sized blocks from a monitored network; writing the fixed-sized blocks to and reading the blocks from at least one storage device; and locating specific data packets and packet streams in the at least one storage device and subsequently reading the located packets from the at least one storage device into memory

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein.

Figure 1:
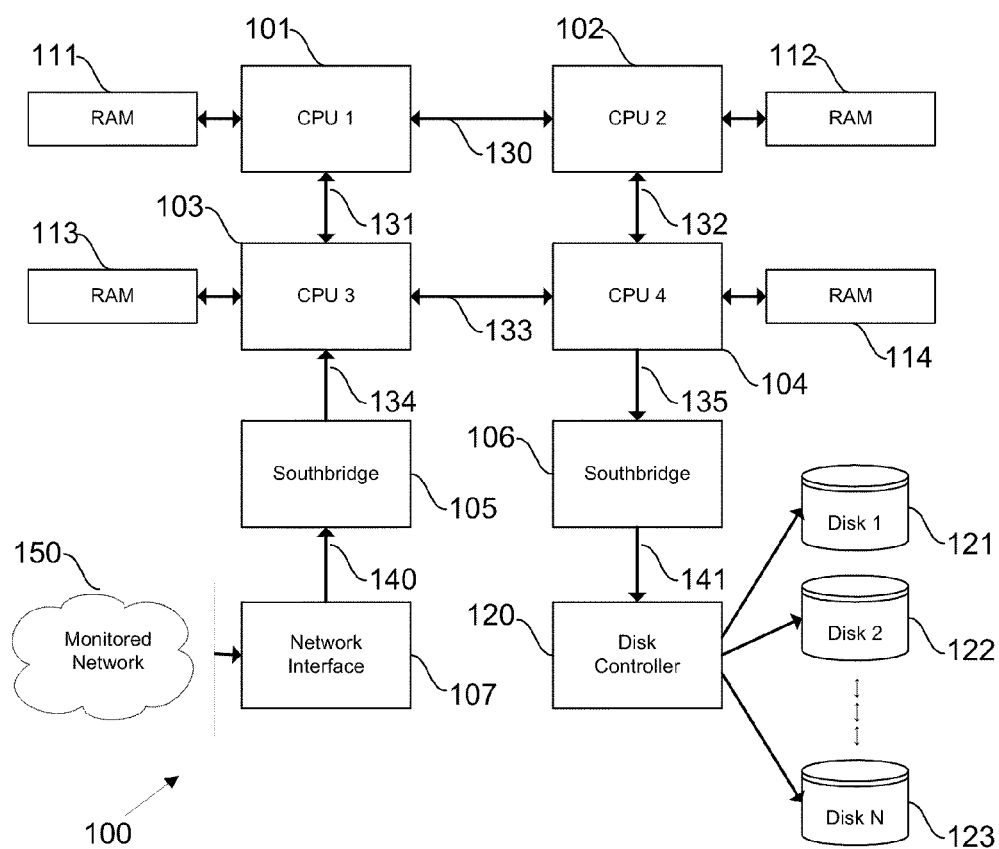
FIG. 1 is a simplified block diagram of a packet file system (PFS) recorder, in accordance with one preferred embodiment of the present invention.

It is noted that the drawings are intended to depict exemplary embodiments of the invention and therefore should not be considered as limiting the scope thereof. The invention will now be described in greater detail with reference to the accompanying drawings.

DETAILED DESCRIPTION OF THE INVENTION

The following describes some of the issues of prior art packet recorders, and how the packet file system (hereafter referred to as PFS) of the present invention addresses these issues.

A typical file system in a modern operating system logically includes variable length files and variable length directories containing variable length names. The underlying implementation makes use of inodes to link together fixed-sized blocks of storage on the disk for each file. The file name, or more precisely, the full pathname of a file is the key to finding the location of the file on the disk. File names are most often assigned by a human, but in some cases are generated by an application program.

Packets are received and recorded much too quickly to be named and managed by a human. Programmatic naming is possible, but typically devolves to numbered filenames. Therefore the file naming feature of modern file systems is not well suited for the management of recorded packets.

In accordance with one feature of the invention, the PFS of the present invention assigns unique identifiers to each packet and to each packet stream (or connection). These identifiers are related to the time the packet was received, or the time when the connection was opened. This provides a strict temporal framework that allows the PFS system to maintain the original order in which the packets were received.

The variable-length nature of files in a prior art file system causes the fixed-sized segments to be spread out over the disk surface over time. This is a result of adding and deleting files, and is referred to as disk fragmentation. Fragmentation typically increases over time as files are created, modified and destroyed. The efficiency of the disk drive decreases as its fragmentation increases, because it spends more and more time moving the head to different tracks in order to locate the desired data.

In accordance with another feature of the invention, the PFS of the present invention practically eliminates fragmentation altogether. This is accomplished by using large, fixed-sized blocks that contain hundreds of packets tightly packed into the block. The blocks are always written in a predictable, ascending order. Therefore the disk head must only move occasionally when writing, and when it does move, it only moves one or two tracks at a time.

A second advantage to packing network data into large blocks, in accordance with the present invention, is an increase in storage efficiency. Most file systems of the prior art write the variable-length data of a file into one or more small, fixed-sized blocks. Placing a single network packet into a file will waste a large amount of disk storage, since packets are rarely a multiple in size of a disk block.

By necessity, storage of network packets tends to be transitory. Ideally one would want to keep all packets ever recorded, but this is not realistic given present limits in prior art disk storage technology. Storing packets in a standard file system would eventually fill up the disk storage units. In such prior art systems a background daemon identifies the oldest files and deletes them when the disk reaches a critical fill level. This requires more CPU and I/O overhead, thus reducing the overall throughput available for recording packets.

In accordance with a further feature of the invention, the PFS of the present invention eliminates the need for a deletion daemon. The oldest packets are automatically overwritten by new packets without requiring any extra CPU or I/O intervention.

Finally, modern file systems of the prior art are less efficient because they require that the data be copied multiple times before it actually lands on the disk surface. Applications operate in a protected memory space known as 'user-space'. The application writes data to a file by calling a function which must copy the data from 'user-space' to 'kernel-space'.

In accordance with yet another feature of the present invention, the PFS of the present invention eliminates this extra layer of data copying. It utilizes direct memory access (DMA) to copy the block containing the packet data directly from 'user-space' to the disk platter.

In summary, the PFS of the present invention is superior to prior art packet recorders that are layered on top of standard file systems. The PFS of the present invention shows marked improvement in throughput, disk usage and reduction in CPU overhead.

Packet File System

Referring now to the drawings, and to FIG. 1 in particular, a packet file system (PFS) 100 for receiving and recording data to one or more storage units in accordance with one embodiment of the invention is illustrated. The packet file system preferably includes one or more CPU's 101, 102, 103 and 104, and one or more random-access memory units 111, 112, 113 and 114 connected to the CPU's. The plurality of CPU's are preferably interconnected by a high speed bus 130, 131, 132 and 133. Southbridge interfaces 105 and 106 are connected to the CPUs by another high speed bus 134 and 135, respectively. One or more network interface controllers 107 are connected to the southbridge interface 105 while one or more disk controllers 120 are connected to the southbridge interface 106. The network interface 107 and disk controller 120 are preferably connected to the southbridge interfaces by yet another high speed bus interface 140 and 141, respectively, such as PCIe, although it will be understood that other high speed bus interfaces presently in use or yet to be developed, can be used. One or more disk drives or storage units 121, 122 and 123 are in turn connected to the disk controller 120 while a monitored network 150 is connected to the network interface 107 in a well-known manner. In accordance with one embodiment of the present invention, the components of FIG. 1 preferably reside and operate on a single computer system. However, it will be understood that the components of FIG. 1 can be located on different computer systems.

The particular arrangement of the CPU's with respect to the network interface 107 and the disk controller 120 in FIG. 1 are most advantageous for providing a flow-through architecture for recording data packets in accordance with the present invention. That is, packets flow into the system from the network interface 107, are processed by CPUs 101, 102, 103 and 104, and flow out of the system onto the disk storage units 121, 122 and 123 through the disk controller 120. This maximizes the use of the bandwidth of the interface buses.

The multi-threaded configuration of the present invention, as will be described in further detail below, preferably makes full use of the plurality of CPUs. Also, the CPUs 101, 102, 103 and 104 may themselves contain more than one CPU core. Accordingly, the present invention can also and/or alternatively utilize the plurality of CPU cores.

PFS Disk Format

Figure 2:
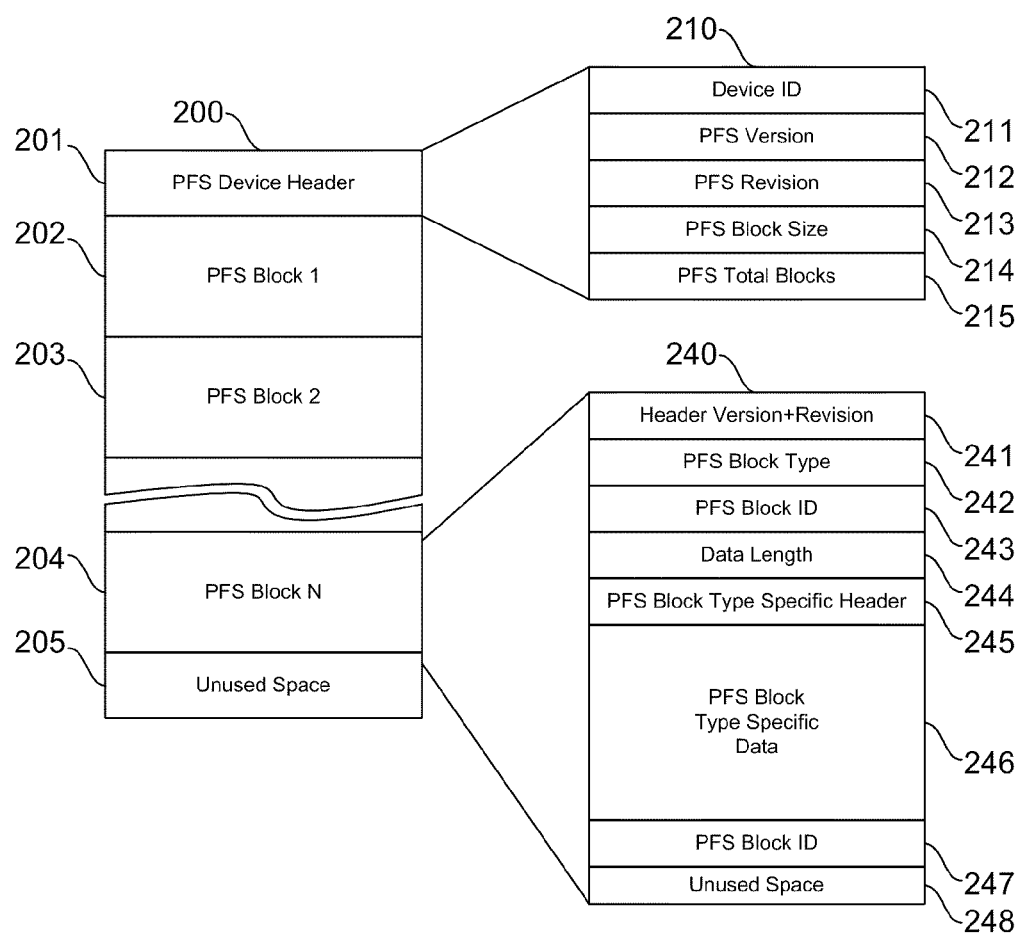
FIG. 2 is a simplified block diagram of the data structures written to a single PFS formatted disk drive, in accordance with one embodiment of the present invention.

Turning now to FIG. 2, a simplified block diagram of the data structures that reside on an individual disk storage unit 121, 122, 123, etc. (FIG. 1) according to one embodiment of the present invention is illustrated. The contents of the disk storage unit are referred to as a packet file system (PFS) device 200. A PFS device 200 may encompass an entire disk drive, or only part of a disk drive, such as a single partition. One embodiment of the present invention utilizes hard disk drives (HDD). Another embodiment of the present invention utilizes solid state drives (SSD). Yet another embodiment of the present invention utilizes network attached storage (NAS). Accordingly, it will be understood that the present invention may utilize practically any type of random-access, block-oriented storage.

Each PFS device 200 preferably includes a single PFS device header 201 that identifies the format and location of the PFS device in the packet file system, one or more PFS blocks 202, 203 and 204, for example, and unused space 205. In accordance with one embodiment of the present invention, the PFS device header 210 contains the following fields: device ID 211, PFS version 212, PFS revision 213, PFS block size 214, and PFS total blocks 215. The device ID field 211 is an integer value that uniquely identifies the PFS device in a given packet file system. The PFS version 212 field and PFS Revision 213 field identify the exact data structures used in the header and block structures of the PFS, and are used when upgrading between different versions of the PFS software to convert from one format to another. The PFS block size field 214 is an integer value of the number of bytes contained in each block on the PFS device. It will be understood that the PFS block size field may vary between PFS devices. The PFS total blocks field 215 is a count of the number of PFS blocks 202-204, etc., associated with the PFS device.

FIG. 2 further illustrates the data structure of a PFS Block 204. The expanded PFS Block 240 contains the following fields: a header version+revision 241, a PFS block type 242, a PFS block ID 243, a data length 244, a PFS block type specific header 245, a PFS block type specific data 246, a PFS block ID 247, and unused space 248. The header version+revision field 241 defines the exact data structure of the PFS block to the software interpreting the block. The packet file system preferably defines more than one type of PFS block. The PFS block type field 242 is an integer that indicates the block type. The software interprets the block contents differently depending on the PFS block type value, as will be described in further detail below. Each PFS block is assigned an identifier, PFS block ID field 243, that is unique within the given PFS device. In accordance with one embodiment of the present invention, the PFS block ID is equivalent to the cardinal number of the block. That is, the first block is assigned the PFS block ID of zero, the second block is assigned the PFS block ID of one, and so on. This cardinal assignment simplifies the maintenance and use of the PFS block index, as will be described in further detail below.

The data length field 244 is a count of the total number of data bytes in the block, which preferably includes the headers, all PFS block type specific data 246, and the PFS block ID 247 at the end of the block. It does not include the bytes in the unused space 248. As each block is allocated a fixed number of bytes on the disk, it is likely that the data written into the block will not be an exact multiple of the PFS block size 214. In the majority of cases the data length 244 will be less than the PFS block size 214.

The PFS block type specific header field 245 preferably contains header information that further describes the data contained in the block. This can vary according to the type of data stored in the block as indicated by the PFS block type field 242. The various types of PFS block types defined in the present invention will be described in further detail below.

The last value written into the block is preferably the PFS block ID 247. In accordance with one embodiment of the present invention, the ending PFS block ID 247 must be identical to the PFS block ID 243 in the header field 241. The ending PFS block ID field 247 acts as a fence that indicates the end of the valid block data. When reading a block from disk, the software process will compare the ending PFS block ID field 247 to the header PFS block ID field 243. If the two values do not match then the software will issue an error message and discard the data in the block. Although the PFS block 240 is shown with its associated fields in a particular order, it will be understood that the fields can be arranged in a variety of different orders without departing from the spirit and scope of the invention.

Packet and Connection ID's

In order to uniquely identify each data packet received from the monitored network 150 or other data source, as well as each connection in the packet file system, and in accordance with a preferred embodiment of the present invention, the data packet ID is preferably defined with a 64-bit value. The most significant 32 bits preferably represent the arrival time of the packet (based on the number of seconds since an epoch). The next 10 most significant bits preferably represent the number of milliseconds since the last one-second interval. The least significant 22 bits preferably represent the sequential packet number in which the packet was received within the given millisecond.

As a data packet is received from the monitored network 150 or other data source by the PFS 100, a new and unique packet ID is generated and assigned to the packet. When a new TCP or UDP connection is detected a new and unique connection ID is generated and assigned to the connection. In accordance with a preferred embodiment of the present invention, the connection ID is set equal to the packet ID of the first packet received in the connection.

In addition to preserving the time of arrival and time of connection creation, the packet ID maintains the temporal ordering of the packets and connections. This temporal ordering is used to simplify the algorithms that locate individual packets and all packets that are associated with a given connection.

PFS Index Table

Figure 3:
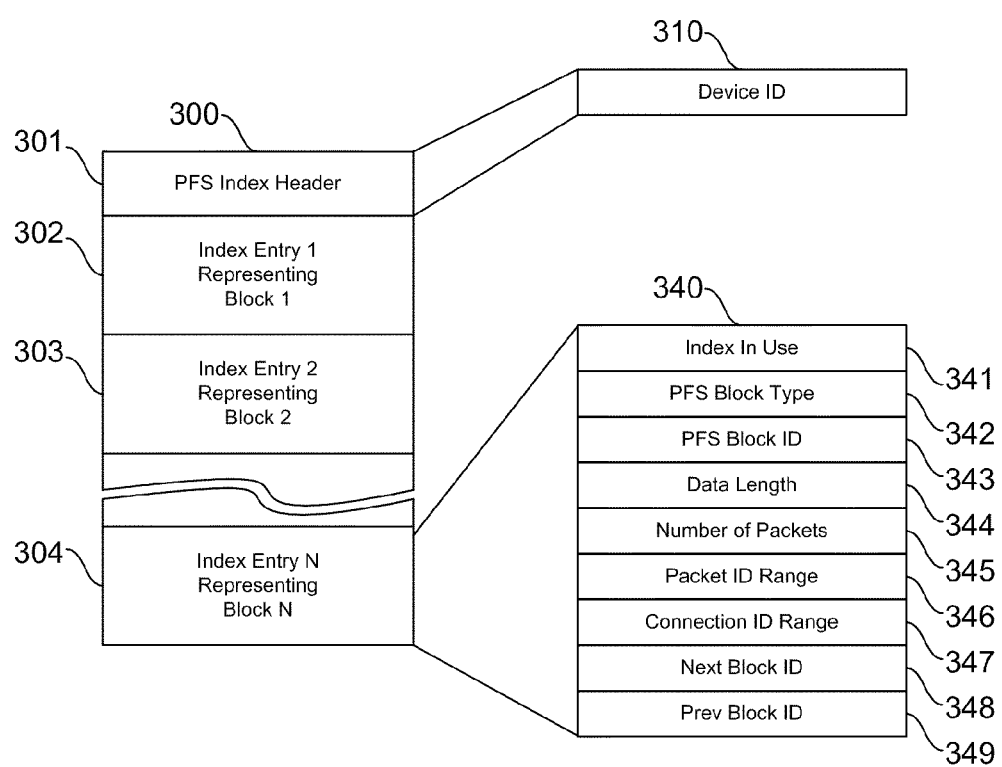
FIG. 3 is a simplified block diagram of a RAM-based PFS index table, in accordance with one embodiment of the present invention.

Referring now to FIG. 3, each PFS device actively mounted in the PFS 100 is associated with an in-memory PFS index table 300. Each index table 300 preferably includes an index header 301 and index entries 302, 303, 304, etc., representing data storage blocks. In accordance with a preferred embodiment of the present invention, the PFS index header 301 includes a device ID 310 representative of the PFS device. The PFS index table increases the speed of packet and connection searching. In accordance with one embodiment of the present invention, the PFS index table is created when the PFS device is mounted by reading the PFS block header 240 (FIG. 2). Selected fields of the PFS block header are copied into the corresponding row of the PFS block index 300.

In accordance with one embodiment of the present invention, a single row in the PFS block index 340 preferably includes an index in use field 341, a PFS block type field 342, a PFS block ID field 343, a data length field 344, a number of packets field 345, a packet ID range field 346, a connection ID range field 347, a next block ID field 348, and a previous block ID field 349. The index in use field 341 is preferably a Boolean value that indicates if the corresponding block on the PFS device contains valid data. The PFS block type field 342 defines the type of data stored in the block. The PFS block ID field 343 is equivalent to the PFS block ID fields 243 and 247 of the corresponding PFS block. The number of packets field

345 is a count of the total number of packets contained in the block, if the PFS block type field 342 is of type 'packet'. The packet ID range field 346 preferably contains the lowest and highest packet ID's of the packets stored in the block. The connection ID range field 347 preferably contains the lowest and highest connection ID's associated with the packets stored in the block. The next block ID field 348 is preferably set to the PFS block ID of the next successive block with the same PFS block type 342. The previous block ID field 349 is preferably set to the PFS block ID of the previous block with the same PFS block type 342. The combination of the next block ID and previous block ID creates a doubly-linked list of blocks of the same type. One embodiment of the present invention utilizes the doubly-linked list to improve the speed of finding blocks of similar types.

PFS Packet Block

Figure 4:
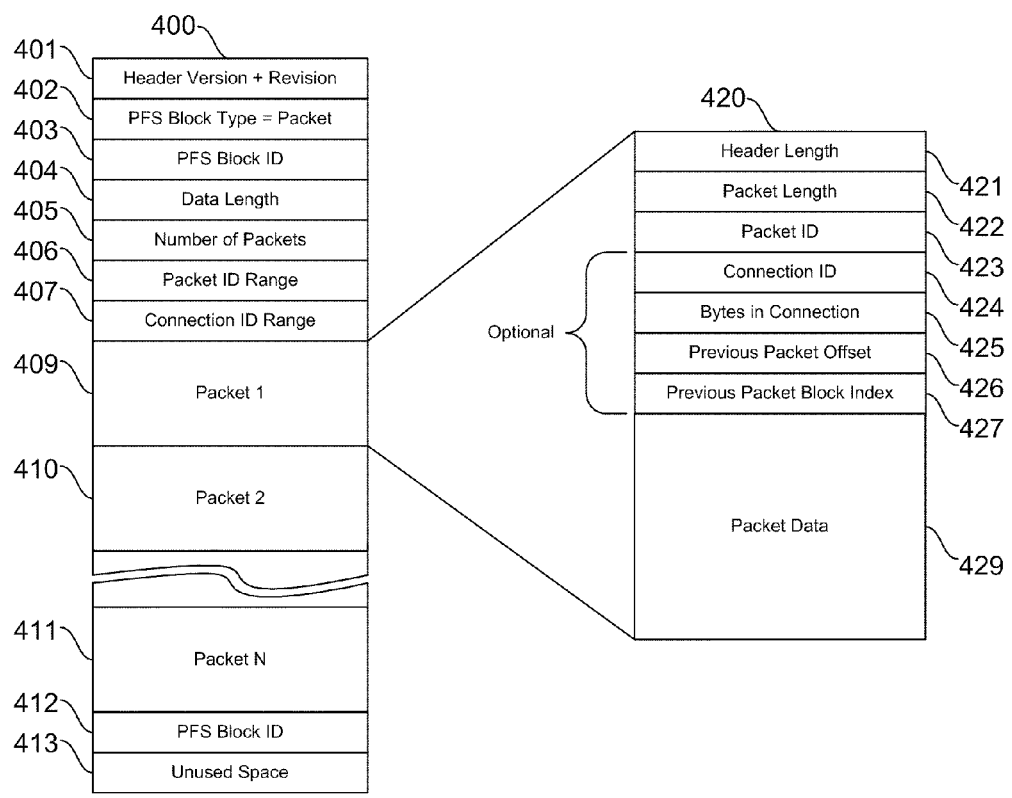
FIG. 4 is a simplified block diagram showing the data elements contained in a single PFS packet block, in accordance with one embodiment of the present invention.

Turning now to FIG. 4, the format of a PFS packet block 400 is illustrated. This block type preferably contains captured packet data. Preferably, the majority of blocks in a PFS device are PFS packet blocks.

The PFS packet block header preferably contains fields that are common to all PFS block types. The header version and revision field 401 identifies the exact format of the block, and is used by software to determine how to interpret the block. The PFS block type field 402 is set to 'packet' type, and indicates that this block contains additional fields: number of packets field 405, packet ID range field 406 and connection ID range field 407. The number of packets field 405 is a count of the number of packets 409, 410 and 411 stored in the block. The packet ID range field 406 preferably records the lowest and highest packet ID's of the packets stored in the block. The connection ID range field 407 preferably stores the lowest and highest connection ID associated with the packets stored in the block. The PFS block ID field 403 and data length field 404 are similar to fields 343 and 344, respectively, of the PFS block index 340 of FIG. 3.

The packets 409, 410 and 411, etc., preferably follow the PFS packet block header 401-407. Each packet 420 preferably includes a header 421-427 and packet data 429 that follows the header. The header preferably includes a length field 421, a packet length field 422, a packet ID field 434, and optional fields 427-427, including a connection ID field 424, a bytes in connection field 425, a previous packet offset field 426, and a previous packet block index field 427. The header length field 421 is a count of the number of bytes in the header. This preferably includes the bytes consumed by the optional fields 424-427, if present. The packet length field 422 is a count of the number of bytes of packet data 429. The packet ID field 423 is the unique packet identifier assigned to the packet.

The Optional fields 424-427 are present only if the packet is part of a TCP or UDP connection. The connection ID field 424 is the first optional field in the packet 420 header. It is a unique connection identifier assigned to the packet that associates the packet with a TCP or UDP connection. The bytes in connection field 425 is a count of the total number of bytes contained in the connection prior to this packet. As will be described in further detail below, the bytes in connection field 425 is preferably used when reading a packet stream from the packet file system.

The next two fields 426 and 427 preferably form a singly-linked list that points to the previous packet in the connection stream. The previous packet offset field 426 contains the byte offset to the previous packet from the start of a given block. The previous packet block index field 427 indicates which block the previous packet resides in. If the previous packet block index field 427 contains all 1's (ones), then the previous packet resides in the present block (i.e. the same block the present packet resides in). Otherwise, the previous packet block index 427 contains the PFS device ID and PFS block ID that contains the previous block.

Packets are preferably written into a PFS packet block 409, 410, etc., sequentially as they are received. Therefore, the temporal ordering of packets in a given PFS packet block is maintained. Because of the multi-threaded implementation of the packet file system, there may be gaps in the sequential numbering of packets in a given PFS packet block, as incoming packets are distributed across multiple threads.

PFS Connection Back-Chaining Introduction

In accordance with a preferred embodiment of the present invention, connection back-chaining is used to increase performance when reading packet streams from the packet file system 100 (FIG. 1).

A TCP or UDP connection may be valid for an extended period of time, from a few seconds to upwards of several days. The distance betweens packets of a given connection increases as the aggregate bandwidth of a network increases. In this case distance refers to the number of bytes between two packets. When viewed in relation to the present invention, this means that packets of the same connection may be spread across multiple PFS packet blocks, making it more difficult to locate all the packets of the connection.

Connection back-chaining creates a singly-linked list, where the first packet of a connection is the tail and the last packet of a connection is the head of the list. The PFS connection block, described below, efficiently records the pointer to the head (or last packet) of each connection list.

PFS Connection Block

Figure 5:
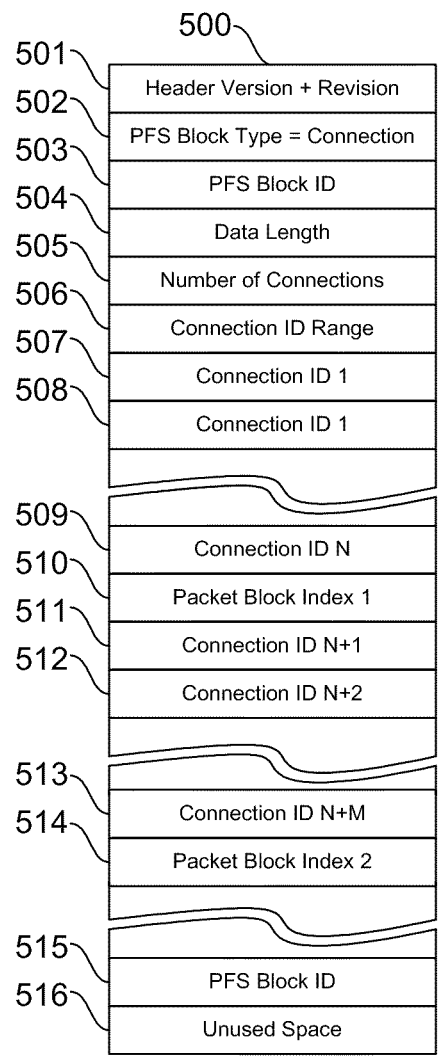
FIG. 5 is a simplified block diagram showing the data elements of a single PFS connection index block, in accordance with one embodiment of the present invention.

Referring now to FIG. 5, the format of a PFS connection block 500 is illustrated. PFS blocks of this type contain indexing information that assists the algorithm responsible for locating the chain of packets associated with a given TCP or UDP connection.

Items 501 through 504 represent the generic header as defined in FIG. 4, items 401 through 404, respectively. Items 505 and 506 are unique to the PFS connection block 500.

The header version+revision 501 identifies the exact format of the block, and is used by software to determine how to interpret the block. The PFS block type 502 is set to 'Connection' type, and indicates that this block contains the number of connections field 505 and connection ID range field 506. The number of connections field 505 is a count of the number of connections 507, 508, 509, 511, 512, 513, and so on, recorded in the block. The connection ID range field 506 stores the lowest and highest connection ID recorded in the block.

In accordance with one embodiment of the present invention, each PFS connection block 500 is preferably constructed in real time as packets are received and TCP or UDP connections are constructed. The system allocates memory for a PFS connection block 500 in cache. Likewise, the system allocates memory for a PFS packet block 400 in cache. Packets are received and written into the cached PFS packet block 400. When a packet is received that is part of a TCP or UDP connection a pointer, called a packet block index, is created that refers to that packet and is stored in the TCP or UDP state storage for that connection.

At some point the last packet of a given connection is received and the connection is closed. The packet file system updates the connection ID range field 407 (FIG. 4) using the connection ID of the closed connection. It also writes the connection ID of the closed connection into the PFS connection block 500. This preferably continues for all TCP or UDP connections whose last packets are written into the PFS packet block 400 (FIG. 4) in cache.

As time goes by the PFS packet block 400 will fill up and is flushed to disk. A new PFS packet block 400 is then created in the cache. When this happens, the packet file system writes the packet block index 510 (of the PFS packet block just flushed) into the PFS connection block 500.

The result is that the PFS connection block 500 contains a group of connection ID fields 507, 508 and 509, followed by a packet block index field 510, followed by a group of connection ID fields 511, 512 and 513, followed by a packet block index field 514, and so forth.

PFS Connection Back-Chaining Details

Figure 7:
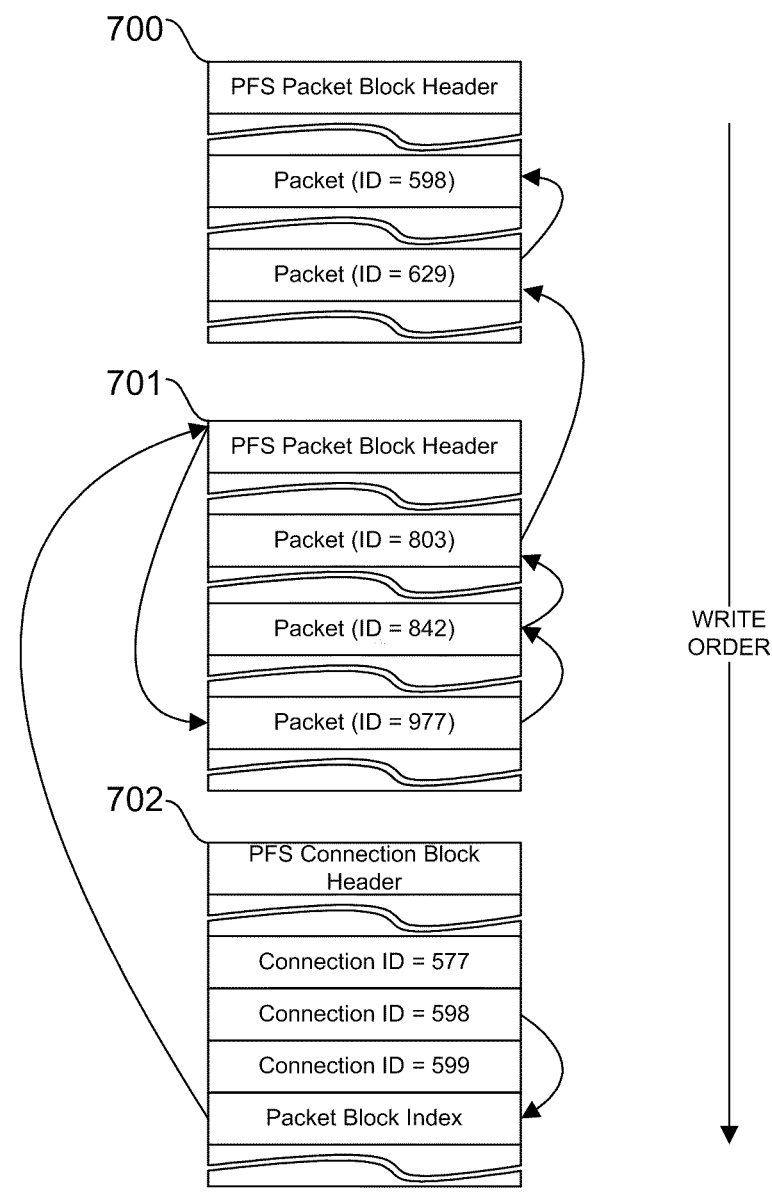
FIG. 7 is a simplified diagram illustrating packet backchaining in a single TCP or UPD connection packet stream, in accordance with one embodiment of the present invention.

Turning now to FIG. 7, a simplified block diagram of connection back-chaining in accordance with one embodiment of the invention is illustrated. By way of example, the connection ID 598 is chained to the packets of the connection. The PFS connection block 702 contains a sequence of connection ID's 577, 598 and 599. These connections are similar in that their last packet resides in the PFS packet block 701. The packet block index of the PFS connection block 702 points to the PFS packet block 701. The algorithm in accordance with the present invention locates the last packet in the block that matches the connection ID 598, which in this case is packet ID 977. This is the last packet of the connection. The header of packet ID 977 contains a pointer to the previous packet, packet ID 842. The packet ID 842 points back to the packet ID 803. Likewise, the packet ID 803 points back to the packet ID 629, which resides in PFS packet block 700. The packet ID 629 points to the packet ID 598. The packet ID 598 is the first packet of the connection, and the last packet in the back-chained list. Preferably, the packets are located in the reverse order in which they were received.

This back-chaining technique greatly facilitates locating all of the packets that belong to a specific TCP Connection. When packets are received and recorded to disk or other storage devices, there are hundreds, if not thousands, of simultaneous connections represented by the packets received. The TCP connection that each packet belongs to must be identified. It is not practical to rearrange the order of the packets into TCP Connection pools before they are recorded because of lack of CPU time and lack of memory. Accordingly, the packets of a TCP connection are "back-chained" together. Essentially, a singly-linked list of packets is created, with the head being the last packet received on the TCP connection. The indices created point to this last packet. When the packets in a TCP connection are read it is only necessary to find the last packet, which points to the next packet, and so on. This mechanism greatly reduces the number of blocks that must be read into memory in order to find all the packets in a TCP connection.

PFS Track Order and Rollover

Figure 6:
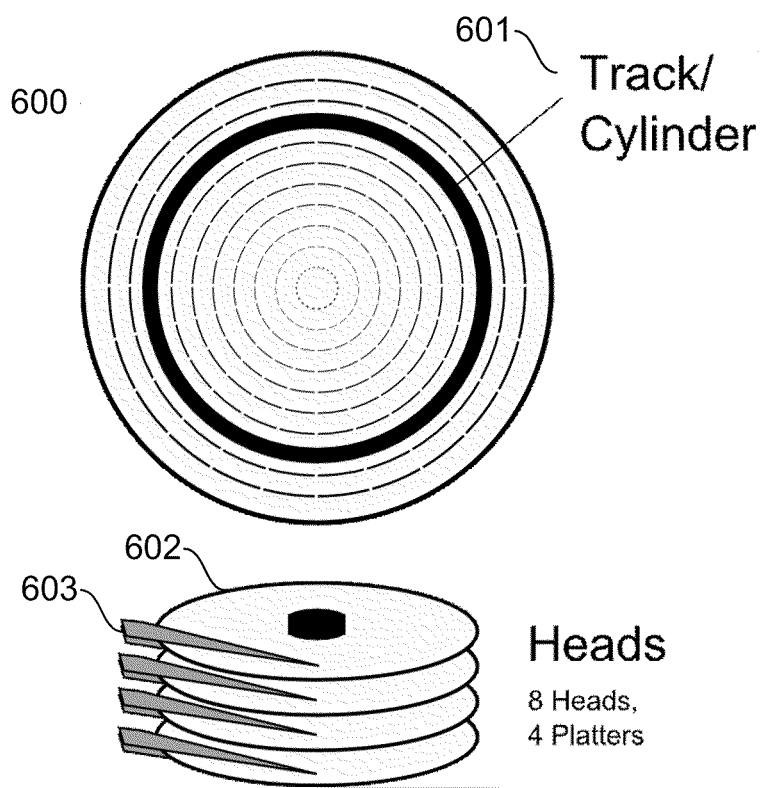
FIG. 6 is a simplified diagram illustrating the components and operation of a typical hard disk drive.

Referring now to FIG. 6, a simplified diagram of a typical hard disk drive 600 is illustrated. The hard disk drive 600 typically includes multiple platters 602 of recording media and read-write heads on moveable arms 603 for each surface of the recording media. The moveable arms are operable to be set to one of a plurality of positions, forming concentric circles of data called 'tracks' 601 on the recording media's surface.

The read-write speed of hard disk drives is limited by the random-access latency of the drive. There are two components to the latency measurement. The first latency measurement deals with the access time between sectors on a single track. This is directly related to how fast the platters spin.

The second latency measurement is related to how fast the read-write heads can move from track to track. For most modern hard disk drives the head latency is directly proportional to the distance that the heads must move.

The present invention minimizes both types of latency. The sector-to-sector access time for a single track is minimized by utilizing very large block sizes. The preferred embodiment of the present invention uses block sizes on the order of 16 megabytes. The large block size is designed to consume all sectors in a track. Therefore the hard disk drive controller can immediately begin to read or write the block data from its cache starting with the next sector that moves under the read-write head.

The track-to-track access latency is minimized by writing to sequential sectors on the disk. This results in moving the read-write heads by only one track at a time. Once the disk is filled up the read-write heads must move all the way back to the opposite edge (track) of the platter. Unfortunately this results in the maximum track-to-track latency once each time the disk is filled up.

The preferred embodiment of the present invention also eliminates the track-to-track latency when the disk is filled up. Instead of writing block data to adjacent tracks the packet file system will write block data to even numbered tracks in ascending order. When the edge of the platter is reached (i.e. all even numbered tracks have been written to) the packet file system begins writing block data to odd numbered tracks in descending order. Therefore, the maximum track-to-track write latency of PFS is limited to the time it takes to move two track widths.

As can be seen from the description above, the packet file system automatically reuses the oldest tracks after the disk is filled up. After all odd-numbered tracks have been written the packet file system reuses the even-numbered tracks in ascending order. This satisfies the requirement that only the newest packets are retained while the oldest packets are overwritten.

Packet Processing

Figure 8:
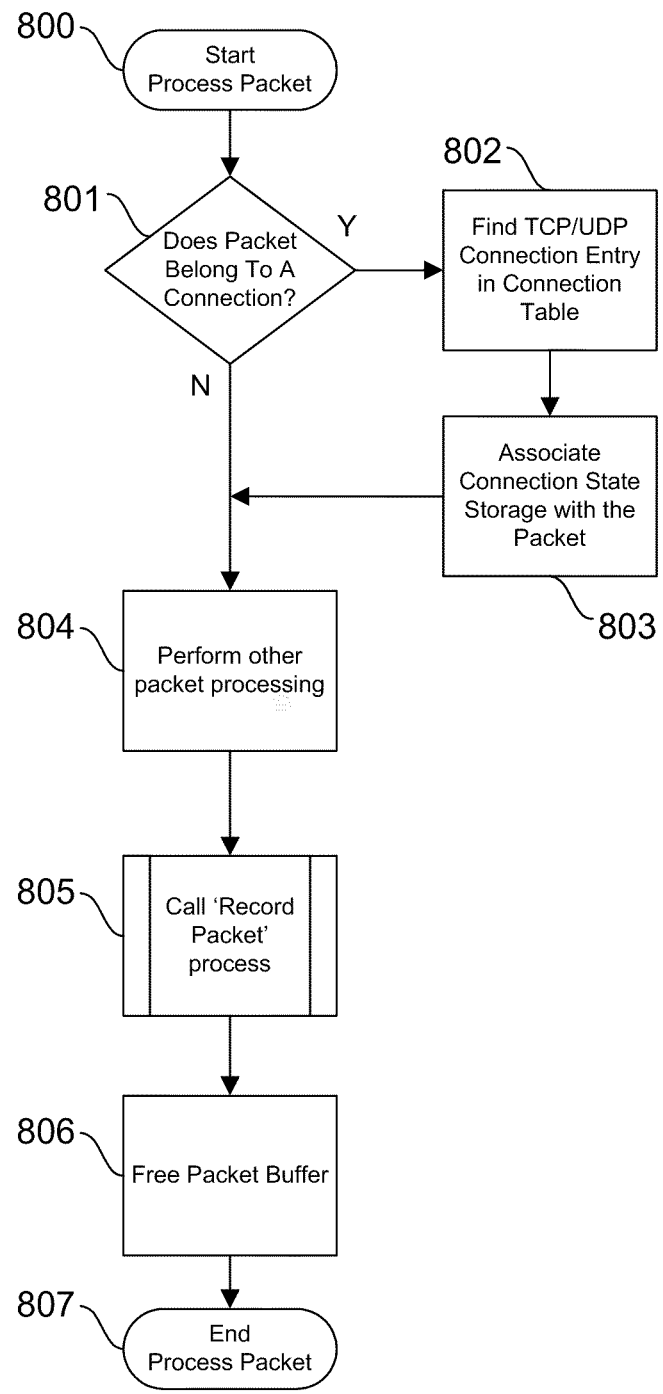
FIG. 8 is a flowchart of a method for processing and recording packets, in accordance with one embodiment of the present invention.

Referring now to FIG. 8 a simplified flow chart describing the process for processing each packet in the packet file system is illustrated. The system retrieves the next available packet from the network interface 107 (FIG. 1) and invokes the process packet procedure at step 800. The transport protocol is tested at step 801 to determine if the packet is part of a TCP or UDP connection-based stream. If the packet is stream oriented then the matching connection is located at step 802. The matching connection contains a state storage buffer that may be used by the packet file system to store temporary information. The state storage buffer is associated with the packet at step 803.

Other optional processing is performed on the packet at step 804, such as packet filtering, deep packet inspection or data extraction. The packet file system subsystem is invoked at step 805 to record the packet. The packet buffer is freed at step 806 and the process packet procedure ends at step 807.

Record Packet Process

Figure 9:
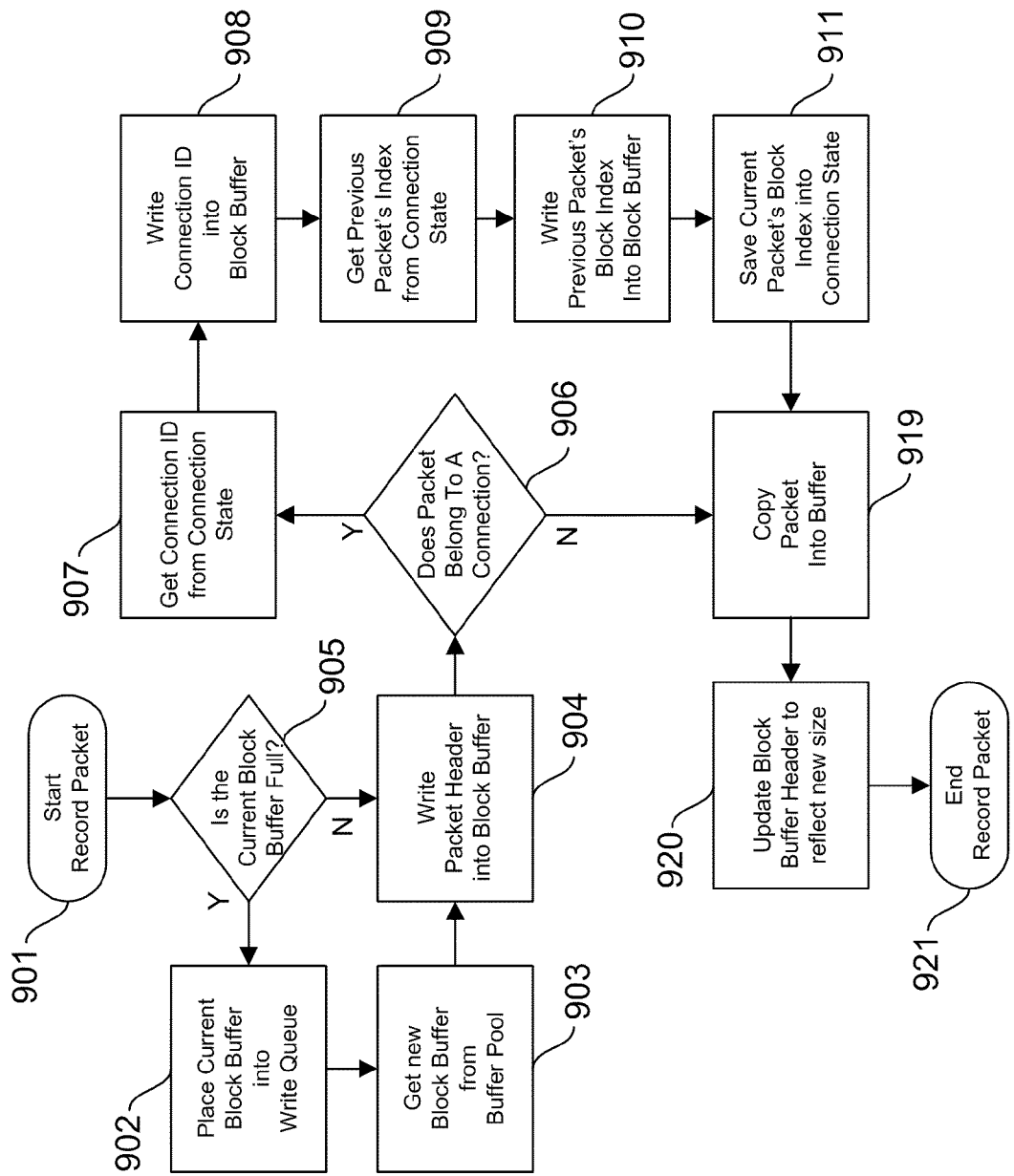
FIG. 9 is a flowchart of a method for recording a packet into the packet file system, in accordance with one embodiment of the present invention.

Referring now to FIG. 9, a simplified flowchart describing the process of recording a packet to disk or other storage device through the packet file system is illustrated. At step 901, the record packet process is invoked. The present PFS packet block is checked to see if the packet can be written into it at step 905. If the present PFS packet block is full then it is placed into the write queue at step 902 and a new PFS packet block is obtained from the buffer pool at step 903. The packet is written into the present PFS packet block at step 904. A check is performed on the packet to test if it is associated with a connection at step 906. If so then the connection state buffer pointer is retrieved from the packet at step 907. The connection ID associated with the packet is written into the present PFS packet block at step 908. The previous packet's index is retrieved from the connection state buffer at step 909 and is written into the present PFS packet block at step 910. The present packet's block index is written into the connection state buffer at step 911. The packet header and data is then copied into the PFS packet block at step 919. The PFS packet block data size is updated to reflect the bytes written at step 920. The process returns at step 921.

PFS Connection State Information

As shown in the preceding section it is important for the packet file system to maintain connection information during the write process. Not all packets of a stream are available at one time. In fact, the individual packets of a stream may slowly trickle in over a period of minutes, hours or even days. The problem is complicated by the fact that the packets of a given connection may be spread across multiple PFS packet blocks.

Figure 10:
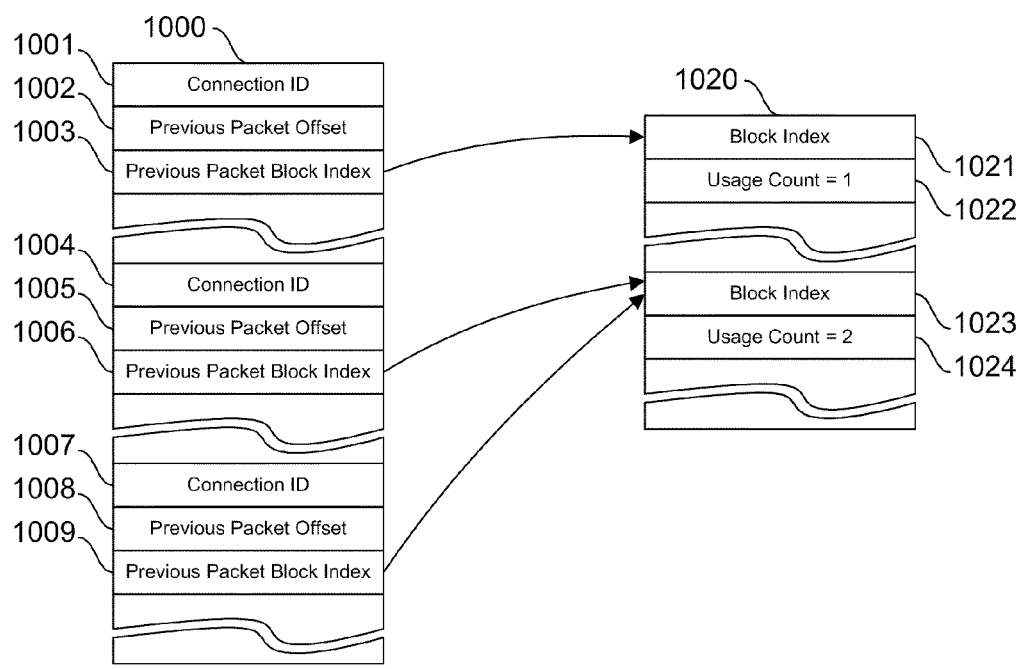
FIG. 10 is a simplified block diagram of a PFS connection state table, in accordance with one embodiment of the present invention.

Referring now to FIG. 10, the preferred embodiment of the present invention solves this problem by introducing a connection state information table 1020 with a plurality of block index fields 1021, 1023, and so on, and a plurality of usage count fields 1022, 1024, and so on. The purpose of the table 1020 is to associate block index information with connection ID's. A block index is a reference to a specific PFS block on a specific PFS device.

A PFS connection block 1000 preferably includes for example sets of connection ID's 1001, 1004, 1007, and so on, each of which is followed by a previous packet offset 1002, 1005, 1008, and so on, respectively, and a previous packet block index 1003, 1006, 1009, and so on, respectively. Instead of pointing directly to a PFS block, the previous packet block index points to a row in the connection state information table 1020. FIG. 10 shows that multiple previous packet block index entries 1006 and 1009 can point to a single block index 1023 in the Connection State Information 1020 table.

It is important to note that the PFS block index for a given PFS packet block is unknown until the block is actually flushed to disk, at which time the block is assigned to a PFS device and to a PFS block on that device. Therefore, any previous packet block index slots that point to a PFS packet block that has not been flushed to disk is undefined, and must be updated to reflect the correct block index only after the PFS packet block has been flushed to disk.

In accordance with one embodiment of the present invention, all active PFS Connection Blocks 1000 are scanned to locate and update previous packet block index values that are undefined. By way of example, previous packet block index 1006 and 1009 both point to a single block index 1023. Once the PFS block represented by the block index 1023 is flushed to disk, it is assigned a PFS device and PFS block ID. The PFS device and PFS block ID are then written into the block index 1023. This eliminates the need to update multiple Previous packet block index entries.

Multi-Threaded Operation

Figure 11:
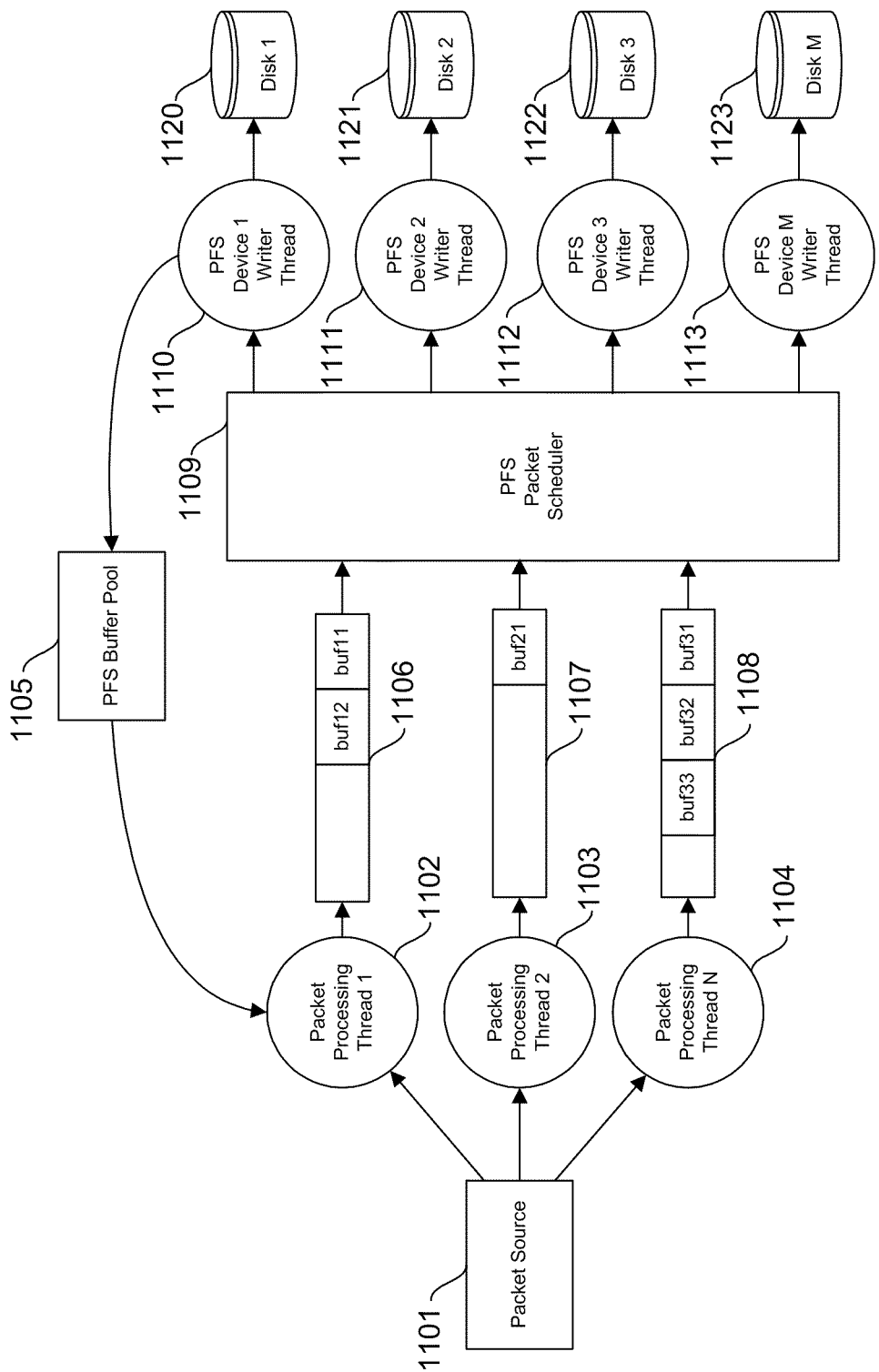
FIG. 11 is a simplified block diagram of the threading architecture in accordance with one embodiment of the present invention.

Turning now to FIG. 11, a simplified block diagram illustrates the thread assignments of one possible implementation of the present invention. In this example, three packet processing threads 1102, 1103 and 1104 have been created, and four PFS device writer threads 1110, 1111, 1112 and 1113 have been created.

Packets arrive for processing from the packet source 1101 and are assigned to one of the packet processing threads 1102, 1103 and 1104. Each of these threads have previously allocated a PFS packet block from the PFS buffer pool 1105.

Each packet is copied into the thread's PFS packet block according to the algorithms described above. When a given thread's PFS packet block is full it is placed into a queue 1106, 1107 or 1108. The PFS packet scheduler 1109 determines which PFS device the packet should be written to. In accordance with one embodiment of the present invention, the PFS packet scheduler preferably assigns the packet based on the number of buffers in the queue and the capacity of the PFS device. However, it will be understood that other scheduling algorithms can be used without departing from the spirit and scope of the present invention.

The PFS device writer threads 1110, 1111, 1112 and 1113 seek to the proper location on the disk drive and write the block to the disk drive or other storage device 1120, 1121, 1122, and 1123. After the write to disk is complete, the PFS packet block is returned to the PFS buffer pool 1105 for re-use.

Reading Individual Packets

Figure 12:
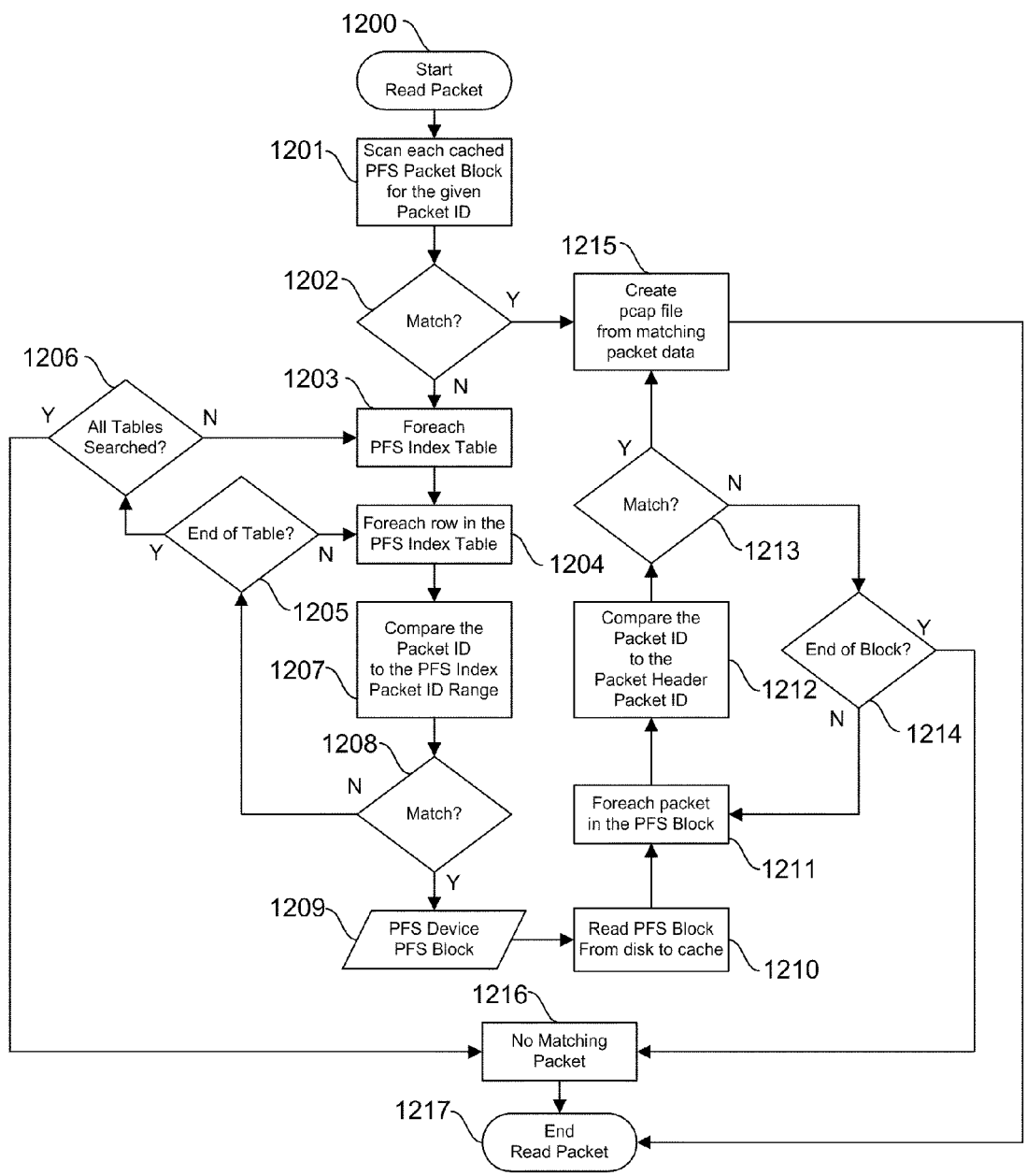
FIG. 12 is a flowchart of a method for reading a single packet from the packet file system, in accordance with one embodiment of the present invention.

Turning now to FIG. 12, a simplified flow chart for locating and reading a single packet from the packet file system for a given packet ID, according to one preferred embodiment of the present invention, is illustrated.

The algorithm begins at step 1200 and scans each cached PFS packet block for the given packet ID in step 1201. If the matching packet is found at step 1202 then a pcap file is created in step 1215 containing the single packet and the process ends.

When no match is found among the cached PFS packet blocks at step 1202, the PFS index tables are scanned for a match in steps 1203, 1204, 1205, 1206, 1207 and 1208. If no match is found in the PFS index tables at step 1208, then the packet ID no longer exists in the packet file system, as it is old enough that his has been overwritten by newer data. The process exits through steps 1216 and 1217.

If a match is found in the PFS Index Tables at step 1208, then the algorithm has a matching PFS device and PFS block as shown at step 1209. The specified PFS packet block is read from disk or other storage device into the cache at step 1210. The PFS packet block is scanned to locate the matching packet in steps 1211, 1212, 1213 and 1214. When a match is found at step 1213, a pcap file is created in step 1215 containing the single packet and the process ends at step 1217.

Reading Packet Streams of Connections

Figure 13:
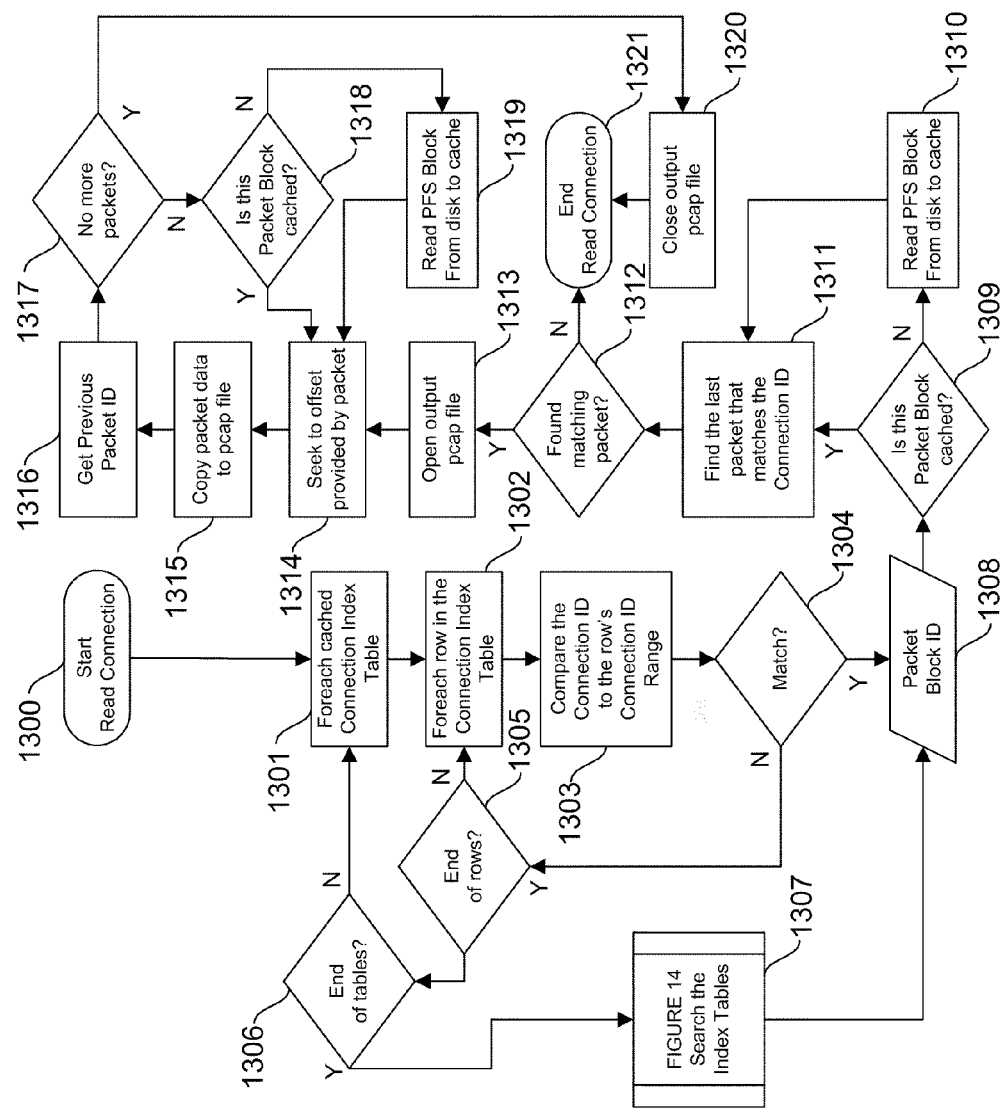
FIG. 13 is a flowchart of a method for reading a set of packets that belong to a single connection in the packet file system, in accordance with one embodiment of the present invention.

Referring now to FIG. 13, a simplified flow chart describing how to locate and read all packets belonging to a specific TCP or UDP connection from the packet file system for a given a packet ID is illustrated.

The algorithm begins at step 1300 and checks each cached connection index table for a match to the given connection ID in steps 1301, 1302, 1303, 1304, 1305 and 1306. If the Connection ID does not match any of the cached connection index tables at steps 1304, 1305 and 1306, then it is necessary to search the PFS index tables in step 1307, which will be described in greater detail below with respect to FIG. 14. If the connection ID matches a connection index table at step 1304, then the algorithm now has the packet block ID in step 1308 for the last packet of the connection.

The algorithm checks to see if the PFS packet block matching the packet block ID is in cache in step 1309. If it is not in the cache then it is read from disk into the cache at step 1310. The last packet of the connection is located in step 1311 and 1312. A new pcap file is opened for writing in step 1313 if the matching packet was found in step 1312. A loop is then entered that locates and writes each packet into the output pcap file. The seek offset for the present packet is read from the packet's header in step 1314, and the seek function is called to set the file pointer to that offset. The packet data is copied into the pcap file in step 1315. The previous packet ID is fetched from the packet header in step 1316, and the loop continues until there are no more packets in step 1317. PFS packet blocks are read from disk into cache as needed in steps 1318 and 1319. Finally, the pcap file is closed in step 1320 and the process is terminated at step 1321.

If no matching packet is found at step 1312, the process is terminated at step 1321.

Search Index Tables

Figure 14:
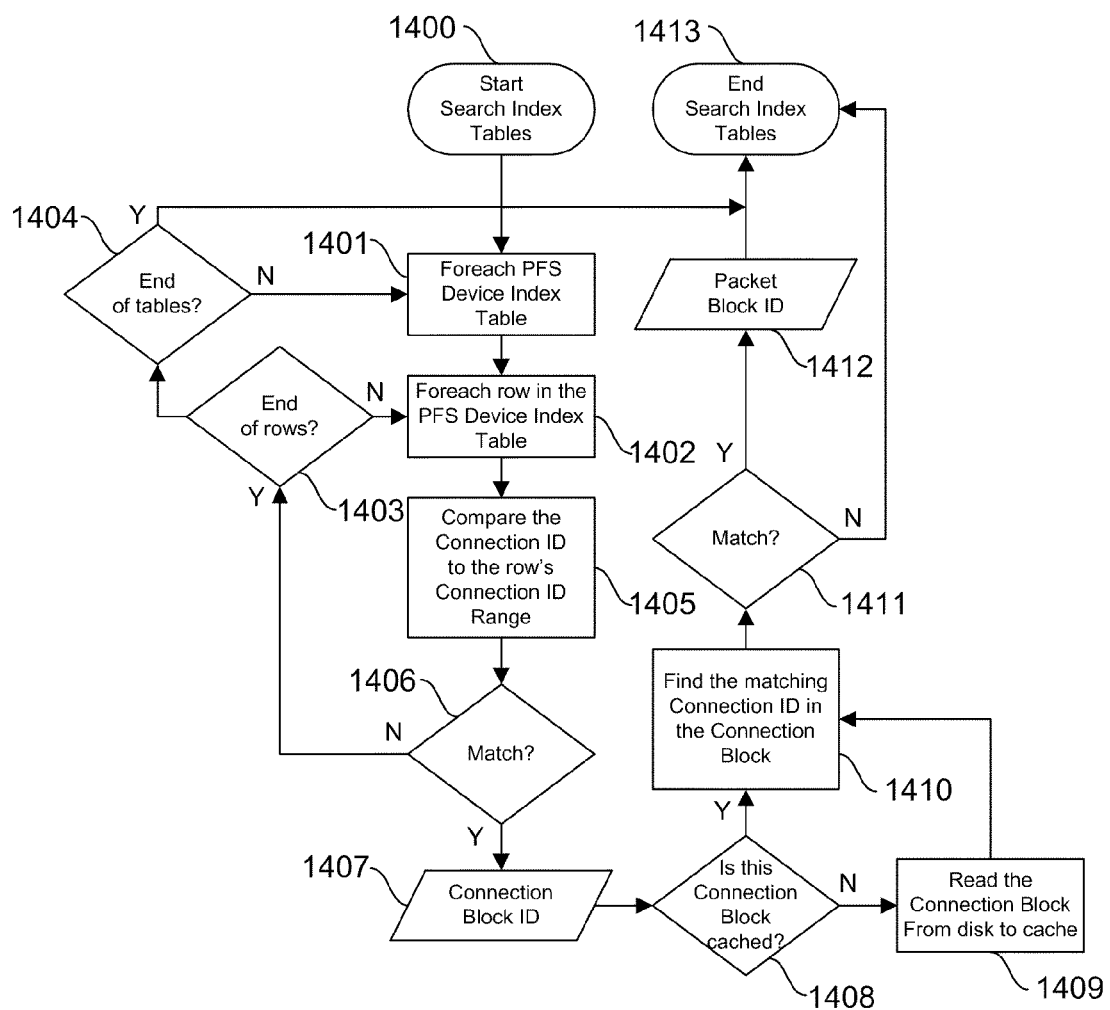
FIG. 14 is a flowchart of a method for searching the index tables of a packet file system, in accordance with one embodiment of the present invention.

Turning now to FIG. 14, a simplified flow chart of a process for searching through the PFS index tables in order to find a matching connection ID is illustrated. This is a subroutine called out at step 1307 in FIG. 13.

The algorithm begins at step 1400 and compares each row in each PFS index table until it finds a row that matches the given connection ID, as shown in steps 1401 through 1406. A match results in a connection block ID as shown in step 1407. The connection block ID refers to a specific PFS connection block on a specific PFS device. If the matching PFS connection block is not presently in cache at step 1408, then it is read from disk into cache at step 1409. The PFS connection ID is scanned for the specified connection ID in steps 1410 and 1411. A match results in a packet block ID in step 1412, which is returned to the caller in step 1413.

The present invention improves upon the prior art of network packet recording in several important ways. First, the PFS utilizes data structures that optimize the use of modern hard disk drive resources. Large block sizes reduce access latency while reducing the number of CPU cycles required per byte of I/O. Second, packet IDs in the present invention replace file names in prior art file systems. This reduces the amount of storage required for directory information and simplifies the processing algorithms. The packet IDs also maintain the temporal order of incoming packets. Finally, the packet file system takes advantage of direct memory access to increase throughput and reduce the number of CPU cycles required for recording packets.

The various components of the above-described invention contribute to a high performance system that is quite capable of achieving packet recording rates in excess of 20 gigabits per second.

It will be understood that the terms "disk" and "hard disk" as well as their equivalent terms used throughout the specification are set forth as exemplary devices for storing the data. Suitable devices may include an entire disk drive, or only part of a disk drive, such as a single partition. One embodiment of the present invention utilizes Hard Disk Drives (HDD). Another embodiment of the present invention utilizes Solid State Drives (SSD). Yet another embodiment of the present invention utilizes Network Attached Storage (NAS). Accordingly, the present invention may utilize practically any type of random-access, block oriented storage.

It will be understood that the term "preferably" and its derivatives as used throughout the specification refers to one or more exemplary embodiments of the invention and therefore is not to be interpreted in any limiting sense.

It will be appreciated by those skilled in the art that changes could be made to the embodiments described above without departing from the broad inventive concept thereof. By way of example, the fields relating to data elements, data structures, tables, blocks, packet streams, threading architecture, and so on, as shown and described, are not limited to a particular order, number and/or size, but may greatly vary without departing from the spirit and scope of the present invention. It will be understood, therefore, that this invention is not limited to the particular embodiments disclosed, but also covers modifications within the spirit and scope of the present invention as defined by the appended claims.

We claim:

1. A system for network packet recording and retrieval comprising:

packet collector means operable to receive and concatenate a plurality of data packets and data packet streams for a particular network connection into fixed sized blocks from a monitored network;

storage manager means operable to write the blocks to and read the blocks from at least one non-volatile storage device;

packet retriever means operable to locate at least one of the data packets and data packet streams in the at least one storage device and subsequently read the located packets from the at least one storage device into memory; and index constructor means for constructing an index that links the data packets of the particular network connection in a connection list by back-chaining the data packets together in reverse sequential order by assigning a first packet of the connection as a tail of the connection list and the last packet of the connection as a head of the connection list and directing a pointer to the head of the connection list.

2. The system of claim 1, and further comprising packet converter means operable to convert data packets from an internal storage format to a portable packet file format.

3. The system of claim 2, and further comprising means for assigning a unique, time-ordered packet identifier to each packet and each packet stream.

4. The system of claim 3, wherein the index constructor means is further operable to construct an index that cross references the unique time-ordered packet identifiers to block locations on the at least one storage device and cross references the unique packet stream identifiers to the block locations.

5. The system of claim 4, and further comprising a packet stream state storage means operable to store packet stream back-chaining information between processing of packets within a packet stream.

6. The system of claim 5, wherein the packet stream state storage means is further operable to store back-chaining information into a block to minimize the time required to locate all packets belonging to a specific packet stream of the particular connection.

7. The system of claim 6, wherein the packet retriever means is further operable to utilize a cross reference index to minimize the time required to locate packets and packet streams in the at least one storage device.

8. The system of claim 7, and further operable to utilize direct memory access (DMA) to copy blocks from memory to the at least one storage device and to copy blocks from the at least one storage device to memory.

9. The system of claim 8, wherein the at least one storage device comprises a plurality of non-volatile disk storage units operable to increase storage capacity and to increase read and write throughput.

10. The system of claim 1, wherein the back-chaining occurs in memory before writing packet list data to the at least one storage device to thereby conserve processing and memory resources.

11. The system of claim 1, wherein the at least one storage device comprises:

a disk with a first set of odd tracks and a second set of even tracks located between the odd tracks; and a read/write head operable to scan one of the first and second sets of tracks while traveling toward a center of the disk and to scan the other of the first and second sets of tracks the tracks while traveling away from the center of the disk to thereby increase read and write throughput.

12. A method for network packet recording and retrieval comprising:

receiving and concatenating data packets and data packet streams for a particular network connection into fixed sized blocks from a monitored network;

constructing an index that links the data packets of the particular network connection in a connection list by back-chaining the data packets together in reverse sequential order by assigning a first packet of the connection as a tail of the connection list and the last packet of the connection as a head of the connection list and directing a pointer to the head of the connection list;

writing the fixed-sized blocks to and reading the blocks from at least one storage device; and locating specific data packets and packet streams in the at least one storage device and subsequently reading the located packets from the at least one storage device into memory.

13. The method of claim 12, and further comprising:
receiving the data packets in internal storage format; and
converting the packets to a portable packet file format.

14. The method of claim 13, and further comprising:
assigning a unique, time-ordered identifier to each data packet and to each packet stream.

15. The method of claim 14, wherein the step of constructing an index further comprises cross referencing
unique packet identifiers to block locations and cross referencing unique packet stream identifiers to block locations.

16. The method of claim 15, wherein the step of back chaining further comprises back chaining a plurality of data packet streams together; and further comprising storing information relating to the packet stream back-chaining into packet stream state storage between processing of data packets within a packet stream.

17. The method of claim 16, and further comprising:
storing the back-chaining information into a block to minimize the time required to locate all data packets belonging to a specific packet stream.

18. The method of claim 17, and further comprising:
referring to the cross reference index to minimize the time required to locate data packets and packet streams in the at least one storage device.

19. The method of claim 18, and further comprising:
initiating direct memory access (DMA) to copy blocks from memory to the at least one storage device and to copy blocks from the at least one storage device to memory.

20. The method of claim 19, wherein the at least one storage device comprises a plurality of non-volatile storage units operable to increase storage capacity and to increase read and write throughput.

21. A system for network packet recording and retrieval comprising:
at least one processor operable to execute computer program instructions;
at least one memory operable to store computer program instructions executable by the processor; and
computer program instructions stored in the at least one memory and executable to perform the steps of:
receiving and concatenating data packets and data packet streams for a particular network connection into fixed sized blocks from a monitored network;
constructing an index that links the data packets of the particular network connection in a connection list by back-chaining the data packets together in reverse sequential order by assigning a first packet of the connection as a tail of the connection list and the last packet of the connection as a head of the connection list and directing a pointer to the head of the connection list;

writing the fixed-sized blocks to and reading the blocks from at least one storage device; and locating specific data packets and packet streams in the at least one storage device and subsequently reading the located packets from the at least one storage device into memory.

22. The system of claim 21, wherein the computer program is further operable to perform the steps of:
receiving the data packets in internal storage format; and
converting the packets to a portable packet file format.

23. The system of claim 22, wherein the computer program is further operable to perform the step of assigning a unique, time-ordered identifier to each data packet and to each packet stream.

24. The system of claim 23, wherein the step of constructing an index further comprises cross referencing unique packet identifiers to block locations and cross referencing unique packet stream identifiers to block locations.

25. The system of claim 24, wherein the step of back chaining further comprises back chaining a plurality of data packet streams together; and further comprises storing information relating to the packet stream back-chaining into packet stream state storage between processing of data packets within a packet stream.

26. The system of claim 25, wherein the computer program is further operable to perform the step of storing the back-chaining information into a block to minimize the time required to locate all data packets belonging to a specific packet stream.

27. The system of claim 26, wherein the computer program is further operable to perform the step of referring to the cross reference index to minimize the time required to locate data packets and packet streams in the at least one storage device.

28. The system of claim 27, wherein the computer program is further operable to perform the step of initiating direct memory access (DMA) to copy blocks from memory to the at least one storage device and to copy blocks from the at least one storage device to memory.

29. The system of claim 28, wherein the at least one storage device comprises a plurality of non-volatile storage units operable to increase storage capacity and to increase read and write throughput.

30. A system for recording and retrieving streams of variable length data comprising:
data collector means operable to identify and gather variable-length packets of data from a plurality of distinct data streams, and assign unique identifiers to each stream and to each packet;
stream manager means operable to construct a backward-chained linked list of variable-length packets, one list for each unique stream;
block manager means operable to concatenate the plurality of variable-length packets into large, fixed-size blocks of memory;
packet file system means operable to map large, fixed size memory blocks directly to smaller disk storage blocks, manage free and used blocks, and reuse the oldest blocks when the disk storage is full;
index manager means operable to maintain a list of all recorded streams along with the identifying information for each stream and a pointer to the last packet of each stream; and disk manager means operable to move fixed size blocks from memory to disk storage and from disk storage to memory.

31. The system of claim 30, further operable to utilize direct memory access (DMA) to transfer blocks from memory to disk storage and to transfer blocks from disk storage to memory with minimal CPU intervention.

32. The system of claim 31, further comprising a plurality of disk storage units configured to simultaneously transfer blocks between memory and the plurality of disk storage units.

33. The system of claim 30, further comprising a connection state information table operable to store packet identifiers in a single location, one location per packet identifier.

34. The system of claim 33, further comprising a plurality of CPU cores for processing the packets of data in multiple threads of execution.

35. A method for recording and retrieving streams of variable length data comprising:
identifying and gathering variable-length packets of data from a plurality of distinct data streams;
assigning unique identifiers to each stream and to each packet;
constructing a backward-chained linked list of variable-length packets, one list for each unique stream;
concatenating the plurality of variable-length packets into large, fixed-size blocks of memory;
mapping large, fixed size memory blocks directly to smaller disk storage blocks, managing free and used blocks, and reusing the oldest blocks when the disk storage is full;
maintaining a list of all recorded streams along with identifying information for each stream and a pointer to the last packet, or tail, of each stream; and
moving fixed size blocks from memory to disk storage and from disk storage to memory.

36. The method of claim 35, and further comprising the step of storing packet identifiers in a single location, one location per packet identifier.

37. The method of claim 35, wherein at least the steps of identifying and gathering, assigning, constructing, and concatenating are performed in multiple threads of execution.

38. A system for recording and retrieving streams of variable length data comprising:
at least one processor operable to execute computer program instructions;
at least one memory operable to store computer program instructions executable by the processor; and
computer program instructions stored in the at least one memory and executable to perform the steps of:
identifying and gathering variable-length packets of data from a plurality of distinct data streams;
assigning unique identifiers to each stream and to each packet;
constructing a backward-chained linked list of variable-length packets, one list for each unique stream;
concatenating the plurality of variable-length packets into large, fixed-size blocks of memory;
mapping large, fixed size memory blocks directly to smaller disk storage blocks, managing free and used blocks, and reusing the oldest blocks when the disk storage is full;
maintaining a list of all recorded streams along with identifying information for each stream and a pointer to the last packet, or tail, of each stream; and
moving fixed size blocks from memory to disk storage and from disk storage to memory.

39. The system of claim 38 and further comprising the step of storing packet identifiers in a single location, one location per packet identifier.

40. The system of claim 38, wherein at least the steps of identifying and gathering, assigning, constructing, and concatenating are performed in multiple threads of execution.

* * * * *